UNITED STATES PATENT OFFICE.

CARLETON ELLIS, OF ROSLINDALE, MASSACHUSETTS, ASSIGNOR TO CHADELOID CHEMICAL COMPANY, OF NEW YORK, N. Y., A CORPORATION OF WEST VIRGINIA.

PAINT AND VARNISH REMOVER.

No. 811,044.  Specification of Letters Patent.  Patented Jan. 30, 1906.

Application filed December 10, 1903. Serial No. 184,663.

*To all whom it may concern:*

Be it known that I, CARLETON ELLIS, a citizen of the United States, residing at Roslindale, in the county of Suffolk and State of Massachusetts, have invented certain new and useful Improvements in Paint and Varnish Removers, of which the following is a specification.

The object of this invention is to produce an improved paint and varnish remover which, owing to the presence of the paint and varnish solvent, "methyl acetone," containing about forty per cent. acetone, some methyl (wood) alcohol, and the balance higher ketones, is, as I have found by experiment, more efficient than a paint and varnish remover containing acetone-free alcohol as a solvent of some paints and varnishes. The pungent odor of acetone ($CH_3 - COCH_3$) is commercially objectionable in paint and varnish removers if any very large quantity of acetone be used therein, and this objectionable pungency of odor is overcome if a mixture of methyl acetone containing about forty per cent. acetone, some methyl acetone, and the balance higher ketones is used for the wax precipitant or gelatinizer in the paint and varnish remover.

In accordance with my present invention I take a suitable quantity of any suitable wax or waxy body and dissolve it in any suitable solvent. Among the waxes suitable for use are paraffin, ceresin, and carnauba. Among the wax solvents suitable for use are benzole, benzin, and gasolene. Numerous other suitable waxes or waxy bodies and numerous other suitable wax solvents well known to those skilled in the art may be used, if preferred, and these may be mixed in any suitable manner to produce the waxy solution.

Having obtained by mixing the wax solvents and waxy bodies in any suitable manner the desired waxy solution, I add thereto an alcoholic body, which is called in trade "methyl acetone" and contains about forty per cent. acetone, some methyl—that is, wood—alcohol, and the balance higher ketones. By the use of said methyl acetone as a gelatinizer a paint and varnish remover is produced at a cost less than would be required if alcohol were used, and cheapness of ingredients is a matter of great importance in said removers.

In some cases it may be preferred to use a quantity of methyl (wood) alcohol and a separate quantity of acetone instead of methyl acetone in mixture with the required wax and wax solvent, depending on the market rates for acetone, which varies considerably in price from time to time.

The proportions of the ingredients that I have found satisfactory are for a liquid remover as follows: benzole, one hundred gallons; methyl acetone, ninety-five gallons; wax, twenty pounds. For liquid removers I also find the following proportions satisfactory: benzole, one hundred gallons; methyl acetone, eighty gallons; wax, fifteen to twenty pounds.

The proportions that I have found satisfactory for a pasty remover are the same as the above with the addition of about forty pounds of wax in each case.

The proportions stated may be varied within wide limits and yield a substantially non-evaporating paint and varnish remover. The ingredients may be mixed in any order, according to the convenience of the maker. The liquids and wax may be shaken up together until dissolved, and this is facilitated by heating.

A paint and varnish remover made in accordance with this invention is substantially neutral in its action on wood, hands, and brushes and acts practically only on the finish which is being removed, and this is an important advantage.

I am the first so far as I know to use methy acetone in paint and varnish removers as a gelatinizer.

What I claim is—

1. As a new article of manufacture, a substantially neutral paint and varnish remover comprising a wax; a solvent for the wax; and a gelatinizer containing about forty per cent.

acetone, some methyl alcohol and the balance higher ketones.

2. A paint and varnish remover comprising benzole, methyl acetone and wax.

3. A paint and varnish remover comprising methyl acetone, other paint and varnish solvents, and a wax.

4. A paint and varnish remover, comprising methyl acetone; other paint and varnish solvents; a wax; and a wax solvent.

In testimony whereof I have affixed my signature in presence of two witnesses.

CARLETON ELLIS.

Witnesses:
 NATHANIEL L. FOSTER,
 HARRY N. CHALEMEN.